United States Patent [19]
Hosbach et al.

[11] Patent Number: 5,870,465
[45] Date of Patent: Feb. 9, 1999

[54] TELEPHONY ADAPTER SYSTEM FOR PROVIDING A USER WITH A VIRTUAL PRESENCE TO AN OFFICE

[75] Inventors: Thomas D. Hosbach; Bryan E. Albert; Frank A. Altschuler, all of San Antonio, Tex.

[73] Assignee: Data Race, Inc., San Antonio, Tex.

[21] Appl. No.: 915,920

[22] Filed: Aug. 21, 1997

[51] Int. Cl.$^6$ .......................... H04M 1/00; H04M 11/00
[52] U.S. Cl. .................. 379/419; 379/93.07; 379/100.12
[58] Field of Search ..................................... 379/419, 442, 379/93.07, 100.12, 100.15, 93.05, 93.09, 211

[56] References Cited

U.S. PATENT DOCUMENTS

| | | |
|---|---|---|
| 4,674,115 | 6/1987 | Kaleita et al. . |
| 5,291,551 | 3/1994 | Conn et al. . |
| 5,384,831 | 1/1995 | Creswell et al. . |
| 5,568,489 | 10/1996 | Yien et al. . |
| 5,598,536 | 1/1997 | Slaughter, III et al. . |
| 5,602,846 | 2/1997 | Holmquist et al. . |
| 5,636,218 | 6/1997 | Ishikawa et al. . |
| 5,764,639 | 6/1998 | Staples et al. ........................... 379/211 |

FOREIGN PATENT DOCUMENTS

| | | |
|---|---|---|
| 0 367 455 A2 | 5/1990 | European Pat. Off. . |
| 0 367 455 A3 | 5/1990 | European Pat. Off. . |
| 0 536 949 A2 | 4/1993 | European Pat. Off. . |

OTHER PUBLICATIONS

Hochreuter, et al, "Hicom 300–eine Vielfalt neuer Moglichkeiten," 2323 Telcom Report (Siemens), 18, 1995, Sep./Oct., No. 5, Munchen, DE, pp. 265–267.

Patent Abstracts of Japan, 60030248 published Feb. 15, 1985, 1 sheet.

Teltone OfficeLink: The Telecommuter's Connection, product information, published Jan. 10, 1995, 1 sheet.

ITU–T Telecommunication Standardization Sector of ITU, Draft v.75 "Data Communication Over the Telephone Network; DSVD Terminal Control Procedures" Draft ITU–I Recommendation V. 75, Feb. 2, 1996, pp. 2–23.

ITU–T Telecommunication Standardization Sector of ITU, Draft v.75 "Data Communication Over the Telephone Network; Procedures for the Simultaneous Transmission of Data and Digitally Encoded Voice Signals Over The GSTN Or Over A Wire Leased Point–to–Point Telephone–Type Circuit," Draft V.DSVD–S, Dec. 8, 1995, pp. 22 pages.

*Primary Examiner*—Jack Chiang
*Attorney, Agent, or Firm*—Conley, Rose & Tayon; Jeffrey C. Hood; E. Alan Davis

[57] ABSTRACT

A telecommunications system which employs commodity simultaneous voice and data (SVD) modems to provide a user with a virtual presence to an office. A first telephony adapter is coupled between a user's home modem and a telephone. A second telephony adapter is coupled between a server modem and the PSTN. The modem data ports are coupled to the PSTN. The first adapter emulates a Central Office (CO) by ringing the telephone, detecting on and off hook conditions from the telephone and supplying line power to the telephone. The first adapter emulates a telephone to the modem voice port by detecting ringing voltages and generating on and off hook conditions. The second adapter emulates a telephone to the PSTN and emulates a telephone to the server modem voice port. The modems establish a connection which enables the user to access a LAN in the office. The home telephone number is forwarded to the server modem and when a call is placed to the user, the call is forwarded by the PSTN to the server adapter. The server adapter notifies the home adapter of the incoming call and the home adapter rings the telephone. When the telephone is answered the home adapter sends DTMF tones to the server adapter to indicate the answered call. The server adapter goes off hook to indicate to the PSTN that the call has been answered. The home adapter couples the telephone to the home modem voice port and the server adapter couples the PSTN to the server modem voice port and the parties converse via voice channel activated by the modems. When the user hangs up, the home adapter sends DTMF tones to notify the server adapter to hang up on the PSTN.

41 Claims, 11 Drawing Sheets

TELEPHONY ADAPTER SYSTEM FOR PROVIDING A USER WITH A VIRTUAL PRESENCE TO AN OFFICE

FIELD OF THE INVENTION

The present invention relates to simultaneous voice and data telecommunications, and in particular to a system and method which provides connectivity between one or more remote users and a remote data site, wherein the remote users have connectivity and/or a virtual presence at the remote data site, including connectivity with third parties through call forwarding operations as well as access to the facilities and features provided by the remote data site.

DESCRIPTION OF THE RELATED ART

Connectivity between remote workers and an office is becoming increasingly important in today's business climate. Business people who travel, commonly referred to as "road warriors", desire to "stay connected" to the corporate office as much as possible. In addition, a current trend in business is the "telecommuter", e.g., an employee who works primarily at home and is remotely connected to the corporate office. Another recent trend in business is referred to as the "remote small office" (RSO) or "branch office" (BO), wherein a group of workers or employees are in a location remote from the company's headquarters or corporate office and are electronically connected to the corporate office.

In each of the above situations, the remote individuals require remote and transparent connectivity to the corporate office, including connectivity to the corporate office local area network (LAN) and the corporate office private branch exchange (PBX) or Centrex Facility. In the present disclosure, a PBX and a Centrex Facility, as well as other types of telephony server systems, are referred to collectively as a PBX for convenience. Further, the remote individuals desire a "virtual presence" at the corporate office, wherein the remote users operate remotely just as if they were physically located in the corporate office.

As corporations move away from mainframe based systems to PC based systems and local area networks (LANs), the options for remote connectivity have improved. In general, personal computers and LANs facilitate remote access to computing resources. Remote connectivity is also made possible with the arrival of affordable, reliable, digital telecommunications services and inexpensive network hardware. Currently, a variety of digital telecommunications services now support remote connections to enterprise networks, among these being Frame Relay, ISDN, Digital Data Service, and T1.

U.S. patent application Ser. No. 08/559,472, U.S. Pat. No. 5,764,639 entitled "System and Method For Providing A Remote User With A Virtual Presence To An Office" whose filing date is Nov. 15, 1995 and whose inventors are Leven E. Staples, W. B. Barker, and Ken Witt, and which is assigned to Data Race, Inc., and which is hereby incorporated by reference, discloses a system and method for providing a user with a virtual presence to an office. U.S. patent application Ser. No. 08/740,775 entitled "System and Method For Providing A Remote User With A Virtual Presence To An Office", whose filing date is Nov. 1, 1996 and whose inventors are Leven E. Staples, W. B. Barker, and Ken Witt, and which is assigned to Data Race, Inc., and which is hereby incorporated by reference, discloses a system and method for providing a user with a virtual presence to an office. U.S. patent application Ser. No. 08/708,267 entitled "System and Method For Providing User Connectivity To A Remote Data Site On A Communication Line While Maintaining Telephone Connectivity On The Communication Line", whose filing date is Sep. 6, 1996 and whose inventor is W. B. Barker and which is assigned to Data Race, Inc., and which is hereby incorporated by reference discloses a system and method for providing user connectivity to a remote data site, such as an Internet Service Provider, on a single line while enabling voice telephone communications on the same line simultaneously. However, the above patent applications disclose systems which use proprietary DSVD modems. That is, the modems are not commodity modems, and are therefore relatively expensive. Commodity SVD modems are designed to connect to a telephone network on their data port and to a telephone instrument on their voice port. In the above applications, proprietary DSVD modems are required because the server modem voice port interfaces to a telephone network rather than a telephone instrument. Furthermore, proprietary signaling functions are needed in the modems of the above applications which are not present in commodity SVD modems. However, it would be desirable for the above systems to be able to use standard commodity modems. Thus, a system which employs low-cost, commodity modems to provide a user with a virtual presence to an office is desired.

SUMMARY OF THE INVENTION

The present invention comprises a telecommunications system which employs commodity simultaneous voice and data (SVD) modems to provide a user with a virtual presence to an office. The system includes a pair of commodity SVD modems, such as DSVD or ASVD modems, coupled to the Public Switched Telephone Network (PSTN). Each of the modems includes a data port and a voice port. The data ports are coupled to the PSTN. One of the modems is coupled to a computer located at a user premises, such as a home, and the other modem is coupled to a server computer located at a remote office. The system also comprises a home telephony adapter and a server telephony adapter according to the present invention. The voice port of the home modem is coupled to a telephone instrument by the home telephony adapter. The voice port of the server modem is coupled to the PSTN or a PBX by the server telephony adapter.

The home telephony adapter comprises a Central Office (CO) interface for coupling to the telephone. The CO interface includes a ring generator for generating a ring voltage, a battery circuit for supplying line power, and a loop current detector for detecting on and off hook conditions. The CO interface elements perform the functions of a CO, to which the telephone would normally be connected. The home telephony adapter also comprises a Single Line Telephone (SLT) interface for coupling to the home modem voice port. The SLT interface includes a hook switch for generating on and off hook conditions, a ring detector for detecting the presence of a ringing voltage (i.e., an incoming call), and a dual tone multi-frequency (DTMF) generator/detector for generating and detecting tones. The SLT interface elements perform the functions of a telephone, to which the modem voice port would normally be connected. The home telephony adapter also includes a switch for selectively connecting the CO interface to the SLT interface, thereby coupling the telephone to the home modem voice port. The home telephony adapter also includes a processor for receiving information from and controlling the various elements of the interfaces.

The server telephony adapter comprises an SLT interface for coupling to the PSTN. The SLT interface includes a hook switch for generating on and off hook conditions and a ring detector for detecting the presence of a ringing voltage. The SLT interface elements perform the functions of a telephone, to which the PSTN would normally be connected. The server telephony adapter also comprises a second SLT interface for coupling to the server modem. The second SLT interface includes a hook switch for generating on and off hook conditions, a ring detector for detecting the presence of a ringing voltage (i.e., an incoming call), and a dual tone multi-frequency (DTMF) generator/detector for generating and detecting tones. The second SLT interface elements perform the functions of a telephone, to which the server voice port would normally be connected. The server telephony adapter also includes a switch for selectively connecting the two SLT interfaces, thereby coupling the PSTN to the server modem voice port. The server telephony adapter also includes a processor for receiving information from and controlling the various elements of the interfaces.

During operation, the user dials up the server and the two modems establish a data connection, such as a V.34 connection, which enables the two modems to perform simultaneous voice and data communications. Then, the user may either place a telephone call using the telephone, and/or forward the home telephone number to the server modem voice port line and subsequently receive telephone calls placed by a third party to the home number. In one embodiment, the server performs the call forwarding via a remote access call forward (RACF) operation to enable third party communications, rather than the user performing the call forwarding operation. Preferably, the user forwards the home telephone number to the server modem voice port line prior to establishing the data connection.

If the user's home telephone number has been forwarded and a third party calls the user, the call is forwarded by the PSTN to the server telephony adapter, which generates an off hook condition to the server modem. In response to the forwarded call, or in response to a call placed directly to the office telephone number, the server modem senses the off hook condition and sends a "ringing signal", such as via a data packet, to the home modem, which generates a ringing voltage on its voice port. The home telephony adapter receives and detects the ringing voltage and rings the home telephone. When the user answers the telephone, the home telephony adapter detects the off hook condition and generates an off hook condition to the home modem to cause the home modem to activate a voice channel with the server modem. Then, the home telephony adapter sends DTMF tones via the voice channel to the server telephony adapter to instruct the server telephony adapter to generate an off hook condition to the PSTN. The home telephony adapter then closes the switch to connect the CO interface to the SLT interface, thereby coupling the home telephone to the home modem voice port. The server telephony adapter receives the DTMF tones and generates an off hook condition to the PSTN and closes the switch to connect the two SLT interfaces, thereby coupling the PSTN to the server modem voice port. Thus, the user is enabled to perform voice communications with the third party while simultaneously performing data communications with the server (and LAN) in the remote office. That is, the user enjoys a virtual presence in the remote office from home while maintaining the ability to receive telephone calls at the home while performing data communications with the remote office.

If the user picks up the telephone to place a call after the connection has been established, the home telephony adapter detects the off hook condition and generates an off hook condition to the home modem voice port and closes the switch to connect the telephone to the home modem. The home modem detects the off hook condition and sends a "ringing signal" to the server modem, which generates a ringing voltage to the server telephony adapter. The server telephony adapter detects the ringing voltage and generates an off hook condition to the server modem voice port and to the PSTN. The server telephony adapter then closes the switch to connect the PSTN to the server modem voice port. The PSTN detects the off hook condition generated by the server telephony adapter and begins to generate a dial tone which is passed through to the server modem voice port by the server telephony adapter. The server modem sends the dial tone to the home modem via the voice channel. The home telephony adapter passes the dial tone through to the telephone and the dial tone is heard by the user. The user then uses the telephone in a normal fashion, i.e., to dial the telephone number of the desired party. Thus, the user is enabled to perform voice communications with the third party while simultaneously performing data communications with the server (and LAN) in the remote office. That is, the user enjoys a virtual presence in the remote office from home while maintaining the ability to receive telephone calls at the home while performing data communications with the remote office.

The user ends the call by hanging up the telephone. The home telephony adapter detects the on hook condition and opens the connection between the telephone and home modem voice port. The home telephony adapter generates DTMF tones to the server telephony adapter via the voice channel to instruct the server telephony adapter to go on hook with respect to the PSTN. The home telephony adapter then generates an on hook condition to the home modem and waits for the next call. The server telephony adapter receives the DTMF tones, generates on hook conditions to both the PSTN and the server modem, opens the connection between the PSTN and the server modem voice port, and waits for the next call.

In an alternate embodiment, the voice ports of the modems are adapted to couple to a headset, rather than a telephone. That is, each of the modems provide a signal pair on which an audio signal is generated for a speaker and the modems each receive an audio signal on a signal pair from a microphone. In this embodiment, the home and server telephony adapter SLT interfaces which would have coupled to the modem voice ports are replaced by headset interfaces for coupling to the modem voice ports. The headset interfaces comprise a 2-to-4 wire hybrid converter. The home telephony adapter 2-to-4 wire converter couples the home modem voice port to the CO interface. The server telephony adapter 2-to-4 wire converter couples the server modem voice port to the SLT interface which is coupled to the PSTN. The headset interfaces also include a DTMF generator/detector. The DTMF detector is used in place of the ring detector and hook switch of the SLT interface. When the server telephony adapter receives a call, the server telephony adapter sends DTMF tones to the home telephony adapter to indicate the received call, rather than generating an off hook condition to the server modem and the server modem sending a "ringing signal" to the home modem and the home modem generating a ringing voltage to the home telephony adapter. Rather than detecting a ringing voltage, the home telephony adapter detects the DTMF tones from the server telephony adapter and rings the home telephone.

The telephony adapters also include a communications port, such as an RS-232 port, for coupling to a communications port on the computers to which they are coupled. Software executing on the computers is operable to perform security functions related to the telephony adapters. In one embodiment, the server computer provides a password or authorization code to the server telephony adapter. The server telephony adapter only enables voice communications with the PSTN by the home telephone if the user provides the correct password, preferably via DTMF tones or via a data packet. In another embodiment, the server telephony adapter includes switches which may be set to specify the password.

BRIEF DESCRIPTION OF THE DRAWINGS

A better understanding of the present invention can be obtained when the following detailed description of the preferred embodiment is considered in conjunction with the following drawings, in which.

Figure 1:
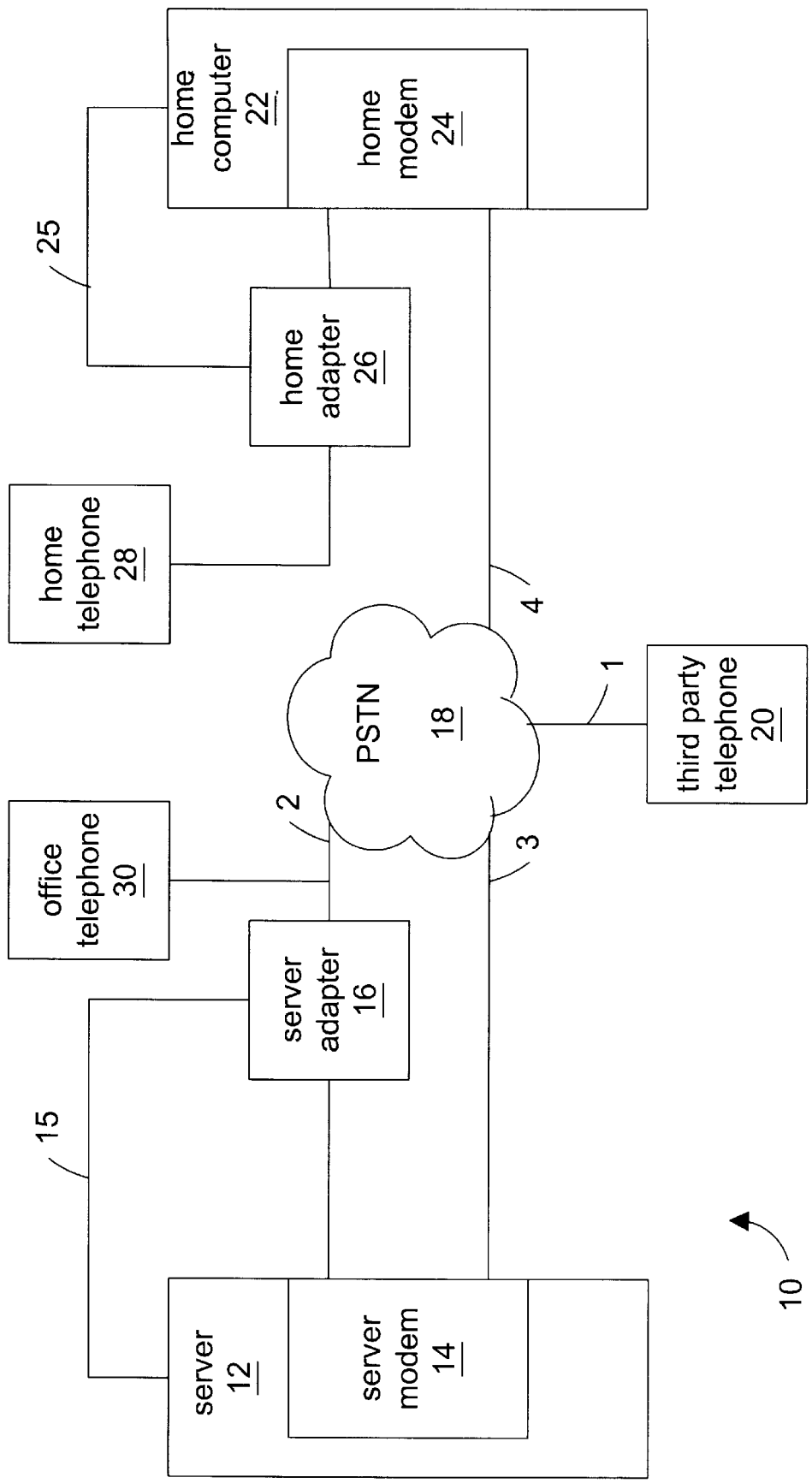
FIG. 1 is block diagram illustrating a telecommunications system according to the preferred embodiment of the present invention.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But, on the contrary, the invention is to cover all modifications, equivalents and alternative following within the spirit and scope of the present invention as defined by the appended claims.

DETAILED DESCRIPTION OF THE SPECIFIC EMBODIMENTS

Incorporation by Reference Data

U.S. patent application Ser. No. 08/559,472 entitled "System and Method For Providing A Remote User With A Virtual Presence To An Office" whose filing date is Nov. 15, 1995 and whose inventors are Leven E. Staples, W. B. Barker, and Ken Witt, and which is assigned to Data Race, Inc., is hereby incorporated by reference. U.S. patent application Ser. No. 08/740,775 entitled "System and Method For Providing A Remote User With A Virtual Presence To An Office", whose filing date is Nov. 1, 1996 and whose inventors are Leven E. Staples, W. B. Barker, and Ken Witt, and which is assigned to Data Race, Inc., is hereby incorporated by reference. U.S. patent application Ser. No. 08/708,267 entitled "System and Method For Providing User Connectivity To A Remote Data Site On A Communication Line While Maintaining Telephone Connectivity On The Communication Line", whose filing date is Sep. 6, 1996 and whose inventor is W. B. Barker and which is assigned to Data Race, Inc., is hereby incorporated by reference.

FIG. 1

System of the Present Invention

Referring now to FIG. 1, a block diagram illustrating a telecommunications system 10 according to the preferred embodiment of the present invention is shown. The system 10 comprises a home computer 22 at a user premises and a server computer 12 at a remote data site, such as a remote office or Internet Service Provider (ISP). The home computer 22 includes a home modem 24 coupled to the home computer 22, preferably via an I/O bus or communications port of the home computer 22. The server 12 includes a server modem 14 coupled to the server 12, preferably via an I/O bus or communications port of the server 12.

The home modem 24 and server modem 14 are operable to perform simultaneous voice and data (SVD) transmissions between one another via the Public Switched Telephone Network (PSTN) 18. For example, the home modem 24 and server modem 14 may be Digital Simultaneous Voice and Data (DSVD) modems or Analog Simultaneous Voice and Data (ASVD) modems. Preferably, the home modem 24 and server modem 14 are commercially available, commodity, SVD modems. Thus, advantageously the cost of the home modem 24 and server modem 14 are minimized. The home modem 24 and server modem 14 each include a data port and a voice port. The home modem 24 data port is coupled to the PSTN 18 via telephone line 4. The server modem 14 data port is coupled to the PSTN 18 via telephone line 3.

The system 10 further comprises a home telephony adapter (home adapter) 26 coupled between a home telephone instrument 28 and the voice port of the home modem 24. The system 10 further comprises a server telephony adapter (server adapter) 16 coupled to the voice port of the server modem 14 and coupled to the PSTN 18 via telephone line 2. If the office has a PBX, the server adapter 16 may be coupled to the PSTN 18 indirectly through the PBX. Therefore, the home user is enabled to use the features of the office telephone system.

Preferably, an office telephone 30 and the server adapter 16 are coupled in parallel to the telephone line 2 via a Y-connector, which in turn couples to the PSTN 18. Thus, when the user is present in the office, the user may place and receive telephone calls on the office telephone 30. However, when the user is present in the home or on the road, the server adapter 16 may place and receive telephone calls on the telephone line 2.

In one embodiment, each of the adapters 16 and 26 include a communications port, such as an RS-232 port, for coupling to their respective computers, 12 and 22. The home adapter 26 and home computer 22 are coupled via a communications medium 25, such as an RS-232 cable, and the server adapter 16 and server 12 are coupled via communications medium 15. In this embodiment, software executing on the server 12 and home computer 22 communicate with the server adapter 16 and home adapter 26, respectively, to provide security, user interface and telephony features as described below.

The server adapter 16 and home adapter 26 operate in a cooperative fashion to provide the user with a virtual presence or connectivity to the remote data site, such as a remote office or ISP. That is, the user is enabled to perform data communications with the remote data site, such as with a local area network (LAN) coupled to the server 12. Furthermore, the user is enabled to simultaneously perform voice communications on the home telephone 28 as if present in the office. That is, the user is enabled to receive and place phone calls, such as from or to a third party telephone 20 coupled to the PSTN 18.

Figure 2:
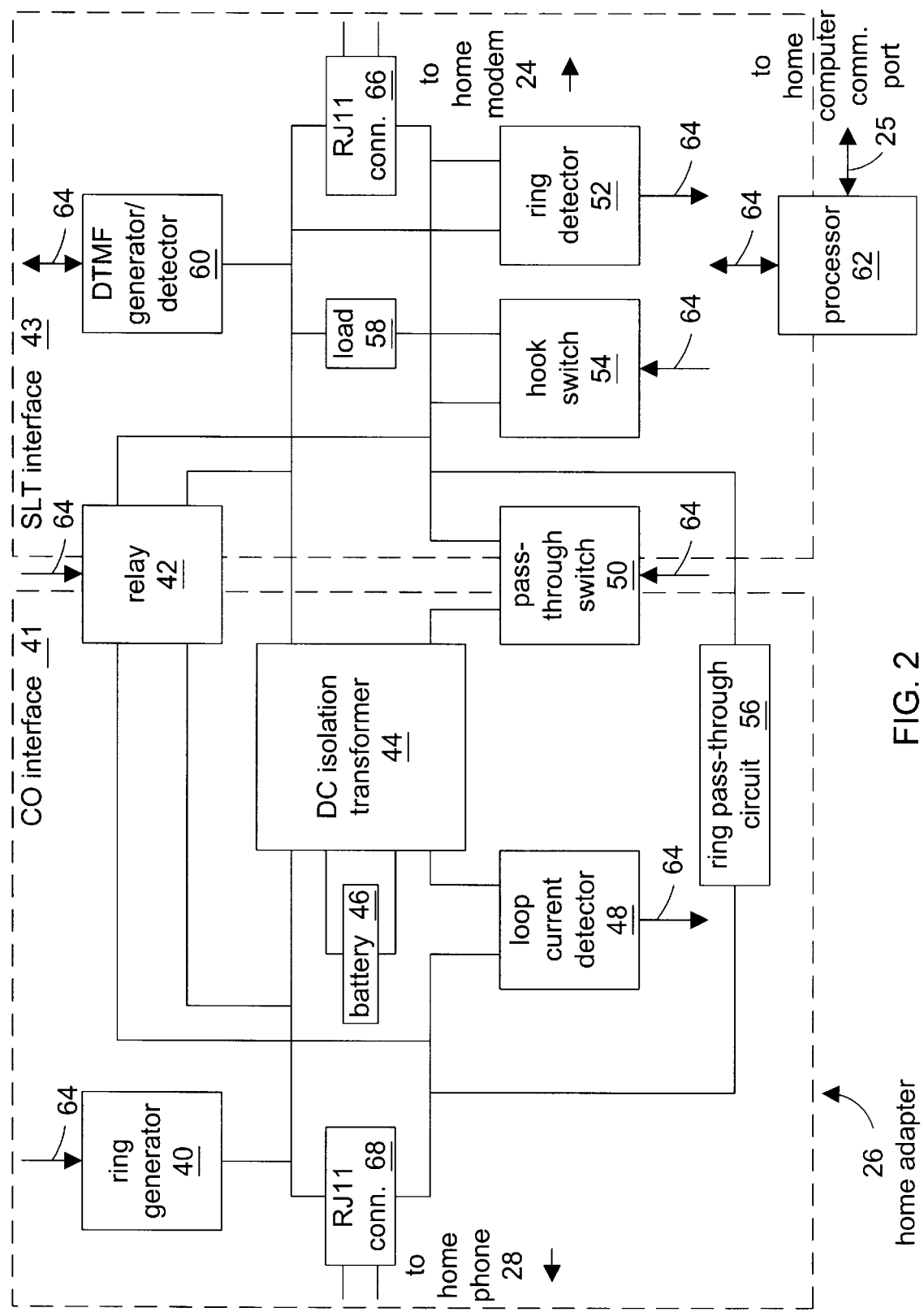
FIG. 2 is a block diagram of the home adapter of FIG. 1.

FIG. 2
Home Adapter

Referring now to FIG. 2, a block diagram of the home adapter 26 of FIG. 1 is shown. The home adapter 26 includes connector 66 for coupling to the home modem 24 voice port and a connector 68 for coupling to the home telephone 28. Preferably, connectors 66 and 68 are RJ11 connectors.

The home adapter 26 includes a Central Office (CO) interface 41 and a Single Line Telephone (SLT) interface 43. The CO interface 41 emulates the interface provided by a CO of the PSTN 18 as seen by a telephone instrument. The SLT interface 43 emulates the interface which would normally be seen by the home modem 24 voice port from a telephone instrument, such as the home telephone 28. A DC isolation transformer 44 provides isolation between the tip and ring signals of the CO interface 41 and the SLT interface 43. A pass-through switch 50 selectively couples the audio signals between the CO interface 41 and the SLT interface 43 under control of a processor 62 via one of a plurality of control signals 64. Preferably, the processor 62 includes a communications port for coupling to the communications port on the home computer 22. In one embodiment, the processor 62 is an 8051 class microcontroller. When the home adapter 26 is not receiving power, or is so controlled by the processor 62, a relay 42 selectively directly couples tip and ring between the CO interface 41 and the SLT interface 43 in response to the control signals 64 from the processor 62.

The CO interface 41 includes a battery circuit or source 46 for supplying line power to the home telephone 28. The CO interface 41 also includes a ring generator 40 for supplying a ringing voltage to the home telephone 28 under the control of the processor 62. The CO interface 41 further comprises a loop current detector circuit 48 for detecting an off hook condition generated by the home telephone 28. That is, the loop current detector 48 notifies the processor 62 of an off hook condition generated by the home telephone 28.

The SLT interface 43 comprises a ring detector circuit 52 for detecting a ringing voltage supplied by the home modem 24. That is, the ring detector 52 notifies the processor 62 of an incoming call from the home modem 24 voice port. The SLT interface 43 also includes a hook switch 54 for selectively coupling a load 58 across the tip and ring signals to generate an on hook condition to the home modem 24 voice port. The load 58 serves to emulate a load imposed by a telephone device such as the home telephone 28. The hook switch 54 is controlled by the processor 62. The SLT interface further comprises a dual tone multi-frequency (DTMF) generator/detector 60. The DTMF generator/detector 60 detects DTMF tones sent from the server adapter 16 and generates DTMF tones to the server adapter 16. The DTMF generator/detector 60 provides notification of the detected DTMF tones to the processor 62 and generates DTMF tones in response to control signals 64 from the processor 62. The DTMF tones are used as signals between the adapters 16 and 26 to perform telephony operations in the system 10 in order to provide the user with a virtual presence to the office.

Preferably, the home adapter 26 further comprises a ring pass-through circuit 56 for passing a ringing voltage from the home modem 24 through to the home telephone 28 in an embodiment where the home modem 24 voice port supplies a ringing voltage.

Figure 3:
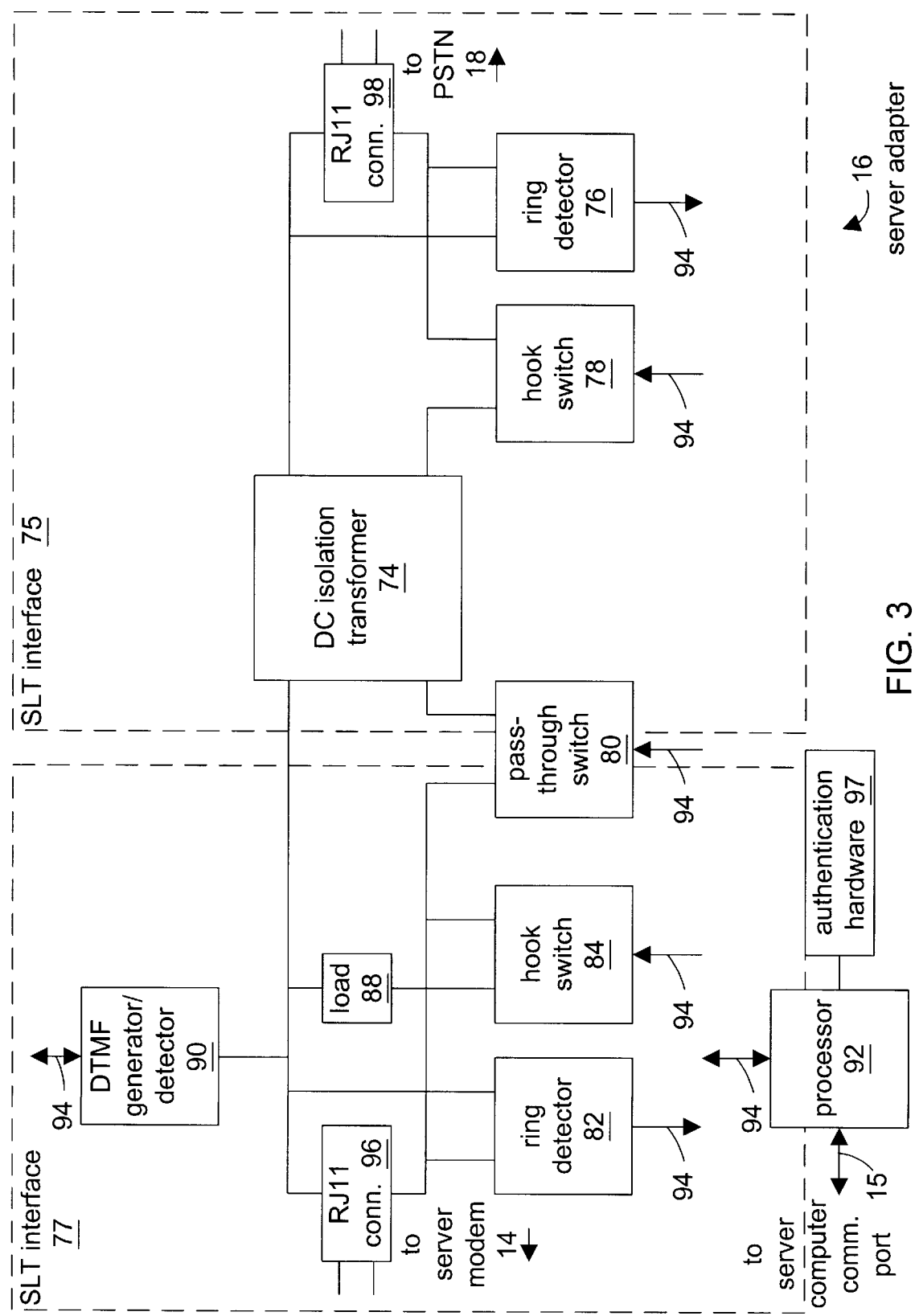
FIG. 3 is a block diagram of the server adapter of FIG. 1.

FIG. 3
Server Adapter

Referring now to FIG. 3, a block diagram of the server adapter 16 of FIG. 1 is shown. The server adapter 16 includes connector 96 for coupling to the server modem 14 and a connector 98 for coupling to the PSTN 18. Preferably, connectors 96 and 98 are RJ11 connectors.

The server adapter 16 includes two Single Line Telephone (SLT) interfaces 75 and 77. SLT interface 77 couples to the server modem 14 voice port and emulates the interface which would normally be seen by the server modem 14 voice port from a telephone instrument, such as the home telephone 28. SLT interface 75 couples to the PSTN 18 and emulates the interface which would normally be seen by the PSTN 18 from a telephone instrument, such as the home telephone 28. A DC isolation transformer 44 provides isolation between the tip and ring signals of the two SLT interfaces 75 and 77. A pass-through switch 80 selectively couples the audio signals between the two SLT interfaces 75 and 77 under control of a processor 92 via one of a plurality of control signals 94. In one embodiment, the processor 92 is an 8051 class microcontroller. Preferably, the processor 92 includes a communications port for coupling to the communications port on the server 12.

SLT interface 77 is substantially similar to SLT interface 43 of the home adapter 26. Elements 74, 80, 82, 84, 88, 90, 92 and 96 are substantially similar to elements 44, 50, 52, 54, 58, 60, 62 and 66 of the home adapter 26 and for brevity the description of these elements will not be repeated.

SLT interface 75 is also similar to SLT interface 77 and comprises a hook switch 78 for selectively providing a path for loop current in order to generate an off hook condition to the PSTN 18. The hook switch 78 is controlled by the processor 92. SLT interface 75 also comprises a ring detector circuit 76 for detecting a ringing voltage supplied by the PSTN 18. That is, the ring detector 76 notifies the processor 92 of an incoming call from the PSTN 18. Preferably, the server adapter 16 also includes authentication hardware 97, such as switches, for setting an authentication password. The use of the authentication hardware 97 will be described below with respect to FIG. 6.

Figure 4:
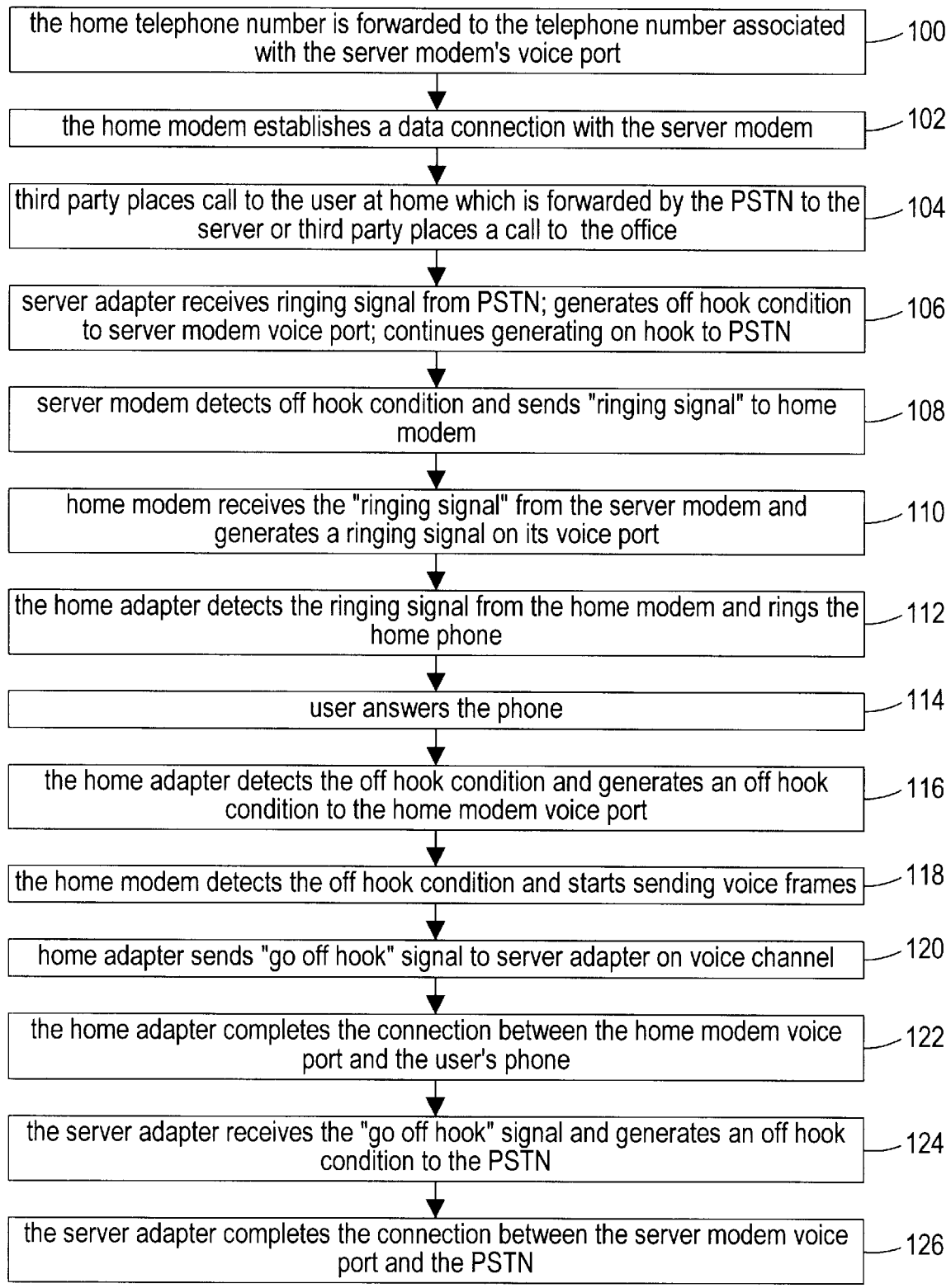
FIG. 4 is a flowchart illustrating operation of the system of FIG. 1 during a call placed by a third party to the user.

FIG. 4
Third Party-Initiated Call Flowchart

Referring now to FIG. 4, a flowchart illustrating operation of the system 10 of FIG. 1 during a call placed by a third party to the user or to office telephone line 2 is shown. A telephone number associated with the user's home telephone 28, i.e., line 4 from the PSTN 18, is forwarded via a call forwarding operation to the telephone number associated with the server modem's 14 voice port, i.e., line 2, in step 100. In one embodiment, the call forwarding operation is performed by the user. For example, the user dials "*72" and the server modem's voice port telephone number to forward calls to the server modem 14 voice port. In another embodiment, the call forwarding operation is performed by the home modem 24 under the control of a software task executing on the home computer 22. In another embodiment, the server 12 controls the server adapter 16 to perform a remote access call forwarding (RACF) operation to forward calls placed to the home telephone 28 to the server modem 14 voice port.

The home modem 24 establishes a data connection with the server modem 14, in step 102. Preferably, establishing a data connection comprises establishing a connection, such as a V.34 with V.42 or HDLC and a multiplexing protocol such as V.70 or V.80, whereby separate data channels and voice channels may be established between the server modem 14 and the home modem 24. That is, establishing a data connection comprises establishing a connection whereby data and voice may be simultaneously exchanged between the server modem 14 and the home modem 24. It is noted that steps 100 and 102 may be performed in either order. In particular, in the case of the RACF operation described above, the data connection may be established on lines 3 and 4 first, then the RACF operation may be performed by the server adapter 16 on line 2.

Preferably, establishing a data connection between the home modem 24 and server modem 14 comprises establishing a Remote Access Service (RAS) dial up connection. That is, the home modem 24 dials up the server modem 14 and software executing on the server 12 validates that the user calling up is authorized to establish a data connection to the server 12. For example, the user must provide a valid user name and password in order to establish the data connection. In one embodiment, Microsoft RAS software executing on the server 12 and home computer 22 cooperate to establish the RAS connection.

A third party 20 places a call to the home telephone 28, i.e., calls the telephone number associated with telephone line 4, and the PSTN 18 forwards the call to the server 12, i.e., to line 2, in step 104. The PSTN 18 forwards the call as a result of the call forwarding operation performed in step 100. Alternatively, a third party 20 places a call to the office telephone 30, i.e., calls the number associated with the telephone line 2, in step 104. In either case, the PSTN 18 generates a ringing voltage on line 2.

The ring detector 76 of the server adapter 16 detects the ringing voltage from the PSTN 18 and notifies the processor 92 of the ringing voltage, in step 106. In response, the processor 92 closes the hook switch 84 of the server adapter 16 thereby generating an off hook condition to the server modem 14 voice port, in step 106. The processor 92 continues to leave the hook switch 78 open thereby generating an on hook condition to the PSTN 18, in step 106, until the server adapter 16 receives notification that the home telephone 28 has been answered. Preferably, the processor 92 begins the process of answering the call, i.e., closes the hook switch 84, only if a valid data connection has already been established on the server modem 14 data port, as in step 102. That is, if no valid data connection has been established, the server adapter 16 does not answer the call. This is advantageous in that the user may be present in the office and desire to answer the call on the office telephone 30. Furthermore, this prevents unauthorized users from establishing a data connection and subsequently receiving telephone calls intended for the authorized user.

The server modem 14 detects the off hook condition generated by the server adapter 16 and, according to standard operation of SVD modems, sends a "ringing signal" to the home modem 24, in step 108. The "ringing signal" may be any means whereby an SVD modem communicates an off hook condition to another SVD modem. In one embodiment, the "ringing signal" comprises a predetermined value in a data packet. The home modem 24 receives the "ringing signal" from the server modem 14 and generates a ringing voltage on its voice port, in step 110.

The home adapter 26 detects the ringing voltage from the home modem 24 voice port and rings the home telephone 28, in step 112. In one embodiment, the home adapter 26 passes the ringing voltage generated by the home modem 24 through a ring pass-through circuit 56. In another embodiment, the ring detector 52 detects the ringing voltage generated by the home modem 24 and notifies the processor 62 of the ringing voltage. In response, the processor 62 causes the ring generator 40 to generate a ringing voltage to the home telephone 28.

The user hears the home telephone 28 ringing and answers the phone 28, in step 114. The loop current detector 48 detects the off hook condition generated by the answered home telephone 28 and communicates the off hook condition to the processor 62, in step 116. In response, the processor 62 closes hook switch 54 to generate an off hook condition to the home modem 24, in step 116. The home modem 24 detects the off hook condition and begins sending voice data to the server modem 14, in step 118. That is, the home modem 24 activates a voice channel with the server modem 14, in step 118.

After the home adapter 26 generates an off hook condition to the home modem 24 voice port, the home adapter 26 sends a "go off hook" signal to the server adapter 16 on the voice channel, in step 120. Preferably, sending the "go off hook" signal comprises the processor 62 controlling the DTMF generator 60 to generate one or more predetermined tones. The home modem 24 receives the tones and transfers the tones to the server modem 14 via the voice channel. In one embodiment, the one or more predetermined tones comprise one or more of the unused DTMF tones. After the home adapter 26 sends the "go off hook" signal, the processor 62 closes the pass-through switch 50 to complete a connection between the home modem 24 voice port and the home telephone 28, in step 122.

The server adapter 16 receives the "go off hook" signal and generates an off hook condition to the PSTN 18, in step 124. Preferably, receiving the "go off hook" signal comprises the DTMF detector 90 receiving the one or more predetermined tones and notifying the processor 92 of the one or more tones. The processor 92 closes the hook switch 78 to generate the off hook condition to the PSTN 18. The processor 92 then closes the pass-through switch 80 to complete a connection between the server modem 14 voice port and the PSTN 18, in step 126. Subsequently, the third party caller and the user of the home telephone 28 are able to perform voice communications with one another while the user simultaneously performs data communications with the server 12. For example, the user may surf the Internet or access data on the server 12 or on a local area network (LAN) coupled to the server 12.

FIG. 5

Call Hangup Flowchart

Figure 5:
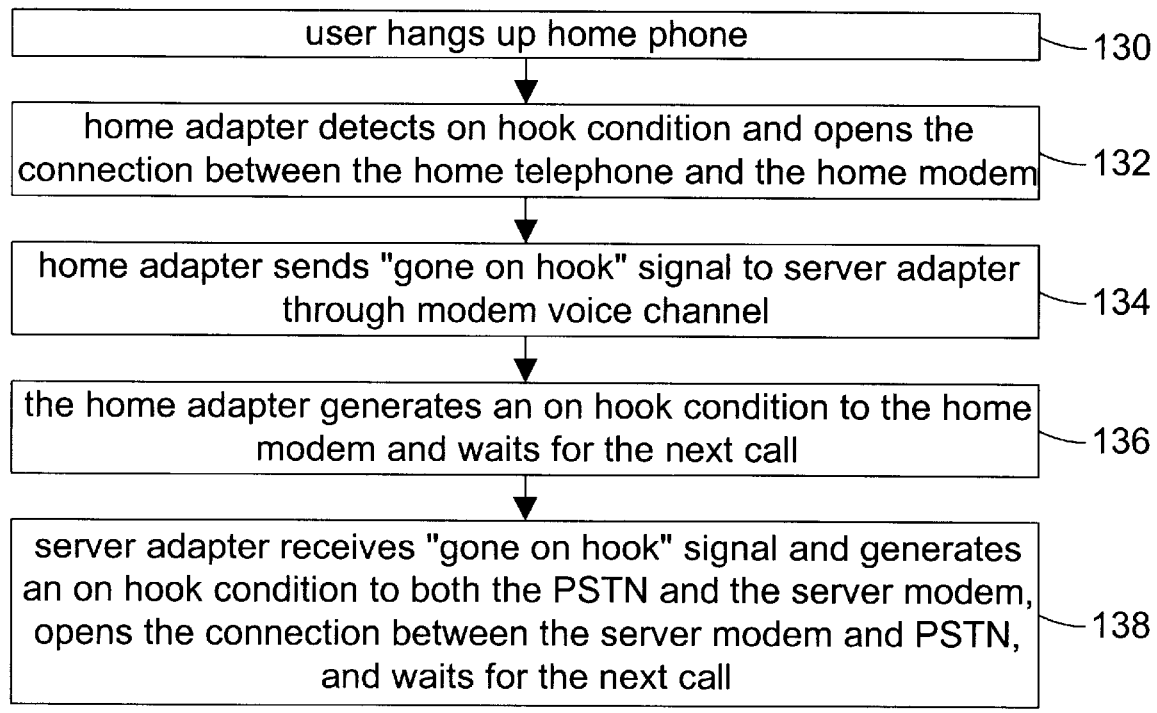
FIG. 5 is a flowchart illustrating steps to end a call, such as the call made according to FIG. 4 or the call made according to FIG. 6.
Figure 6:
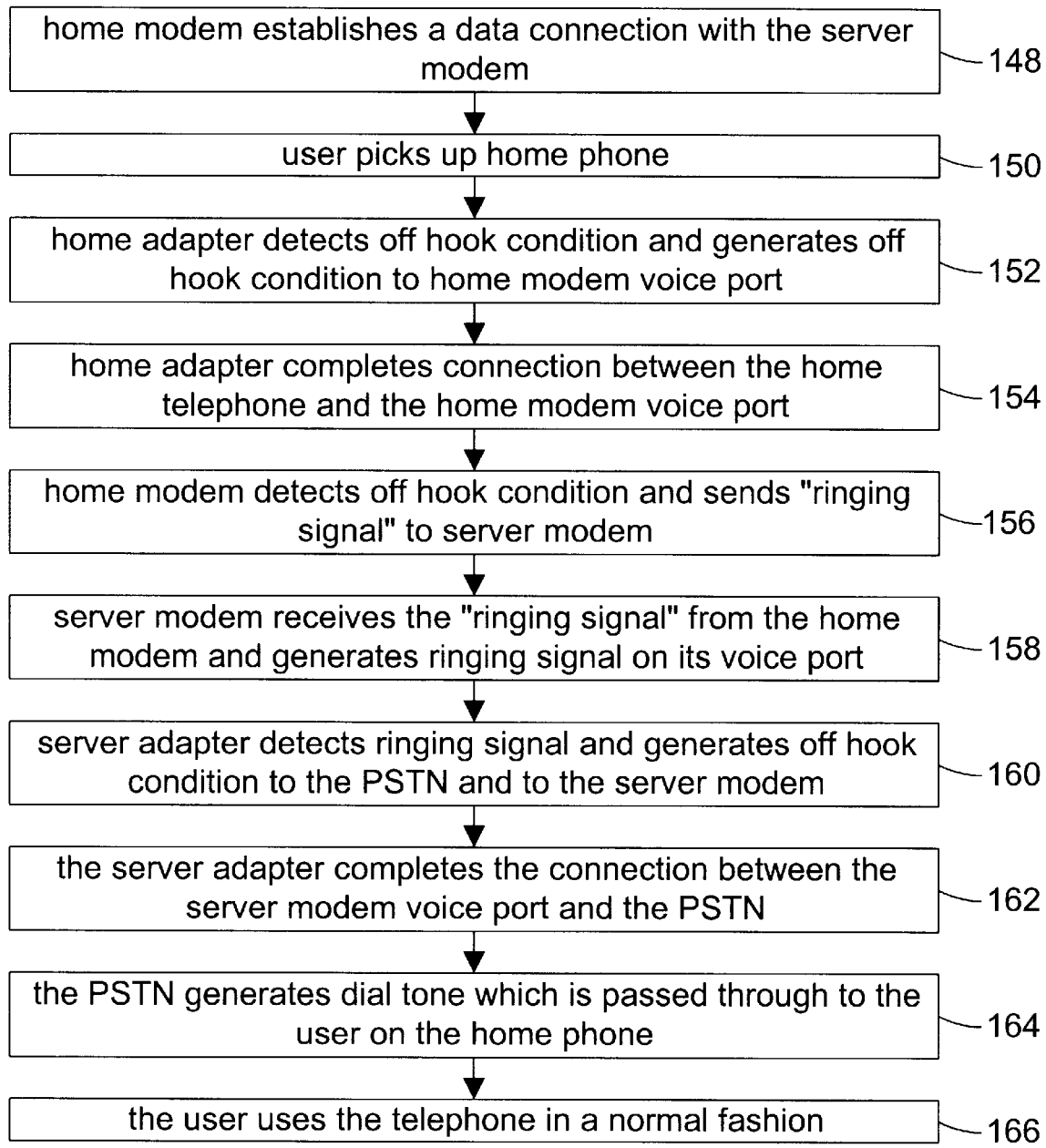
FIG. 6 is a flowchart illustrating operation of the system of FIG. 1 during a call placed by the user of the home telephone.

Referring now to FIG. 5, a flowchart illustrating steps to end a call, such as the call made according to FIG. 4 or the call made according to FIG. 6, is shown. The user initiates the end of the call by hanging up the home telephone 28, in step 130. The loop current detector 48 detects the loss of loop current and notifies the processor 62 of the on hook condition, in step 132. In response, the processor 62 opens the pass-through switch 50 thereby opening the connection between the home telephone 28 and the home modem 24, in step 132.

Next, the home adapter 26 sends a "gone on hook" signal to the server adapter 16 via the voice channel, in step 134. Preferably, the "gone on hook" signal comprises the DTMF generator 60 generating one or more predetermined DTMF tones. Next, the processor 62 opens the hook switch 54 generating an on hook condition to the home modem 24 and waits for the next call, in step 136.

The server adapter 16 receives the "gone on hook" signal from the home adapter 26, in step 138. Preferably, the DTMF detector 90 detects the one or more predetermined DTMF tones and notifies the processor 92 of the tones. In response, the processor 92 opens hook switch 78 to generate an on hook condition to the PSTN 18, in step 138. The processor 92 also opens hook switch 84 to generate an on hook condition to the server modem 14, in step 138. The processor 92 then opens the pass-through switch 80 to open the connection between the server modem 14 voice port and the PSTN 18 and waits for the next call, in step 138.

FIG. 6

User-Initiated Call Flowchart

Referring now to FIG. 6, a flowchart illustrating operation of the system 10 of FIG. 1 during a call placed by a the user of the home telephone 28 is shown. The user calls the telephone number associated with the server 12 telephone line 3 and the home modem 24 establishes a data connection with the server modem 14, in step 148 as in step 102 of FIG. 4. In one embodiment, software executing on the home computer 22 operates to provide a user interface to the user. The user interface includes a dialing directory which may be populated by the user to include telephone numbers to dial for establishing data connections, such as the server telephone line 3. The software receives input from the user and in response controls the home modem 24 to dial the selected telephone number.

In one embodiment, establishing the data connection further comprises the server 12 performing authentication of the home user. Preferably, the software executing on the home computer 22 sends user/password information to the server 12. The server 12 looks up the user in a database and determines whether or not a match of the user/password information is contained in the database. The server 12 prevents the server adapter 16, preferably via the communications medium 15, from activating voice channels between the server modem 14 and the home modem 24 until the user has been authenticated.

In another embodiment, the authentication hardware 97 of the server adapter 16 is used for setting a password. Preferably, after activating a voice channel between the home modem 24 and server modem 14, the user dials on the home telephone 28 the password which matches the switch setting on the authentication hardware 97. The server adapter 16 authenticates the password and enables connection with the PSTN 18 (in step 160 below) only if the user is authenticated. In another embodiment, the password is provided to the server adapter 16 by software executing the server 12 via the communications medium 15 rather than via the authentication hardware 97.

The user picks up the home telephone 28 to place a call, in step 150. The loop current detector 48 senses the loop current generated by the off hook condition generated by the home telephone 28 and notifies the processor 62 of the off hook condition, in step 152. In response, the processor 62 closes the hook switch 54 to generate an off hook condition to the home modem 24 voice port, in step 152.

Then, the processor 62 closes the switch 50 to complete a connection between the home telephone 28 and the home modem 24 voice port, in step 154. The home modem 24 detects the off hook condition generated by the home adapter 26 and sends a ringing signal to the server modem 14, in step 156. The server modem 14 receives the "ringing signal" from the home modem 24 and generates a ringing voltage on its voice port, in step 158. The ring detector 82 detects the ringing voltage from the server modem 14 voice port and notifies the processor 92 of the ringing voltage, in step 160. In response, the processor 92 closes the hook switch 78 to generate an off hook condition to the PSTN 18, in step 160. The processor 92 also closes the hook switch 84 to generate an off hook condition to the server modem 14, in step 160.

Preferably, the processor 92 responds to the call, i.e., closes the hook switch 78, only if the user has been authenticated. That is, if the user has not been authenticated, the server adapter 16 does not generate an off hook condition to the PSTN 18 and therefore, the unauthorized caller is not enabled to place an outgoing call. This is advantageous in that it prevents unauthorized users from placing telephone calls, in particular long distance telephone calls, using the office telephone line 2. As described above, the authentication may be performed via the data channel or the authentication may be performed via a voice channel, such as the user using tones to dial a password.

The processor 92 closes the pass-through switch 80 to complete a connection between the server modem 14 voice port and the PSTN 18, in step 162. The PSTN 18 generates a dial tone in response to the off hook condition and the dial tone is passed through on the voice channel to the home telephone 28, in step 164. The user hears the dial tone and uses the telephone in a normal fashion, in step 166. That is, the user hears the dial tone and dials a telephone number and performs voice communication with a third party.

FIGS. 7–11

Alternate Embodiment

FIGS. 7–11 relate to an alternate embodiment of the system 10 of FIG. 1 and method of using the system 10. FIGS. 7–11 are similar to FIGS. 2–6, respectively, but include differences according to the alternate embodiment. The alternate embodiment is directed toward a home adapter and a server adapter configured for use with SVD modems which include an interface to a speaker and microphone, referred to as a headset interface, rather than an interface to a telephone. In particular, the modems do not generate a ringing voltage, supply line power, or detect a on hook and off hook conditions on their voice ports. Instead, the modems generate an audio signal for a speaker and receive an audio signal from a microphone, as will be discussed below. Consequently, the adapters 16 and 26 provide an interface for coupling to the headset interface of the modems rather than to a telephone interface. Furthermore, the method employs a different signaling technique to communicate some of the call sequence events, as will also be discussed below. Since FIGS. 7–11 are similar to FIGS. 2–6, therefore differences between the two sets of Figures will primarily be described below.

Figure 7:
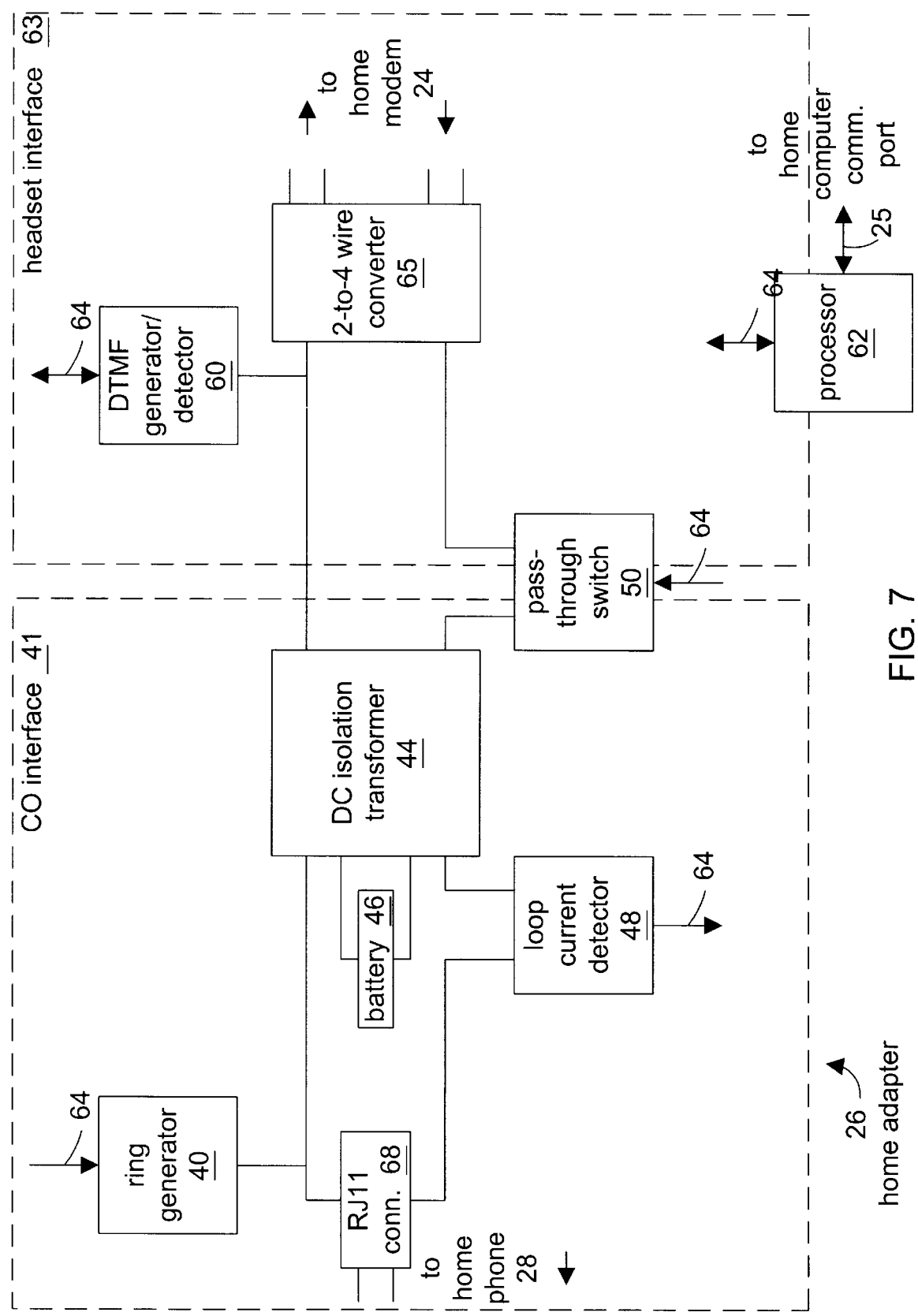
FIGS. 7–11 are similar to FIGS. 2–6, respectively, and describe an alternate embodiment of the system of FIG. 1.

Referring now to FIG. 7, a block diagram of an alternate embodiment of the home adapter 26 of FIG. 1 is shown. Various elements of the home adapter 26 of FIG. 7 are similar to elements of the home adapter 26 of FIG. 2 and similar portions are numbered identically for clarity. Consequently, the description of those similar elements will not be repeated in the interest of brevity. The CO interface 41 portion of the home adapter 26 of FIG. 7 is similar to the CO interface 41 of FIG. 2. The CO interface 41 of the home adapter 16 of FIG. 7 does not, however, include the ring pass-through circuit 56. This is because the home modem 24 of the alternate embodiment does not generate a ringing voltage. Furthermore, the home adapter 26 of FIG. 7 does not include the relay 42 of FIG. 2 since the home modem 24 voice port is not adapted to couple to the telephone 28.

As described above, the home modem 24 of the alternate embodiment comprises a headset interface for driving an audio signal to a speaker and for receiving an audio signal from a microphone. The home adapter 26 of FIG. 7 includes a headset interface 63 rather than the SLT interface 43 of FIG. 2. The headset interface 63 is configured to interface to the headset interface of the home modem 24. The headset interface 63 comprises a 2-to-4 wire converter 65 coupled between the CO interface 41 and the home modem 24. The 2-to-4 wire converter 65 converts the 2 wire tip and ring signals from the CO interface 41 into two signals pairs, a speaker signal pair and a microphone signal pair, for interfacing to the headset interface of the home modem 24.

Preferably, the 2-to-4 wire converter 65 also includes driver circuitry for performing buffering and gain control of the speaker and microphone signals.

As described in FIGS. 4–6, the hook switch 54 of FIG. 2 was employed to generate the presence of on and off hook conditions. However, in the alternate embodiment, the DTMF generator 60 of FIG. 7 is employed to communicate on and off hook conditions, rather than the hook switch 54 of FIG. 2. As described in FIGS. 4–6, the ring detector 52 of FIG. 2 was employed to detect ringing conditions. However, in the alternate embodiment, the DTMF detector 60 of FIG. 7 is employed to detect an incoming call, rather than the hook switch 54 of FIG. 2. The operation of the DTMF generator/detector 60 to communicate on and off hook conditions and to detect incoming calls will be described in more detail with respect to FIGS. 9–11.

Figure 8:
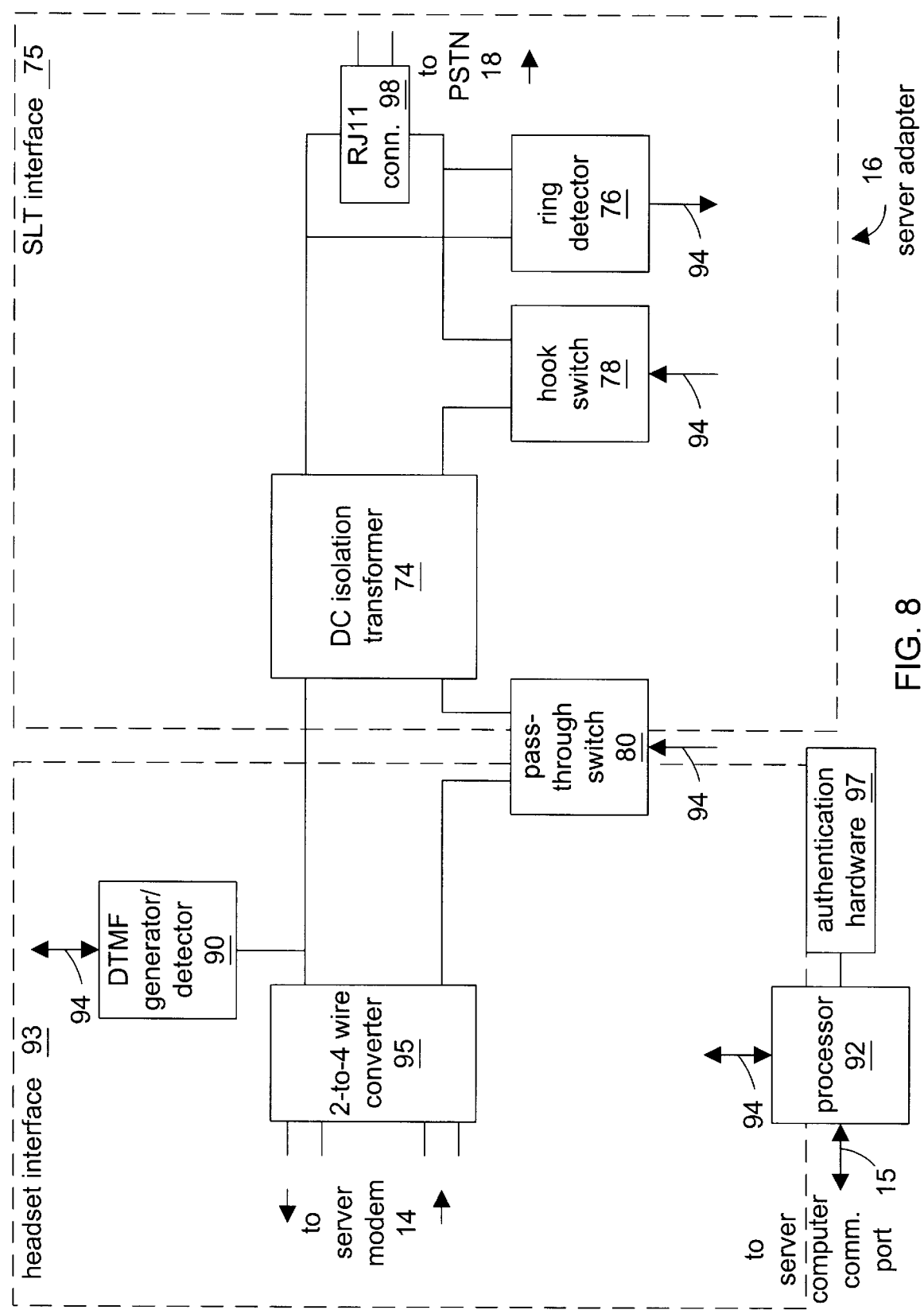

Referring now to FIG. 8, a block diagram of an alternate embodiment of the server adapter 16 of FIG. 1 is shown. Various elements of the server adapter 16 of FIG. 8 are similar to elements of the server adapter 16 of FIG. 3 and similar portions are numbered identically for clarity. Consequently, the description of those similar elements will not be repeated in the interest of brevity. The SLT interface 75 portion of the server adapter 16 of FIG. 8 is similar to the SLT interface 75 of FIG. 3.

As described above, the server modem 14 of the alternate embodiment comprises a headset interface for driving an audio signal to a speaker and for receiving an audio signal from a microphone. The server adapter 16 of FIG. 8 includes a headset interface 93 rather than the SLT interface 77 of FIG. 3. The headset interface 93 is configured to interface to the headset interface of the server modem 14. The headset interface 93 comprises a 2-to-4 wire converter 95 coupled between the SLT interface 75 and the server modem 14 voice port. The 2-to-4 wire converter 95 converts the 2 wire tip and ring signals from the SLT interface 75 into two signals pairs, a speaker signal pair and a microphone signal pair, for interfacing to the headset interface of the server modem 14. Preferably, the 2-to-4 wire converter 95 also includes driver circuitry for performing buffering and gain control of the speaker and microphone signals.

As described in FIGS. 4–6, the hook switch 84 of FIG. 3 was employed to generate the presence of on and off hook conditions. However, in the alternate embodiment, the DTMF generator 90 of FIG. 8 is employed to communicate on and off hook conditions, rather than the hook switch 84 of FIG. 3. As described in FIGS. 4–6, the ring detector 82 of FIG. 3 was employed to detect ringing conditions. However, in the alternate embodiment, the DTMF detector 90 of FIG. 8 is employed to detect an incoming call, rather than the hook switch 84 of FIG. 3. The operation of the DTMF generator/detector 90 to communicate on and off hook conditions and to detect incoming calls will be described in more detail with respect to FIGS. 9–11.

Figure 9:
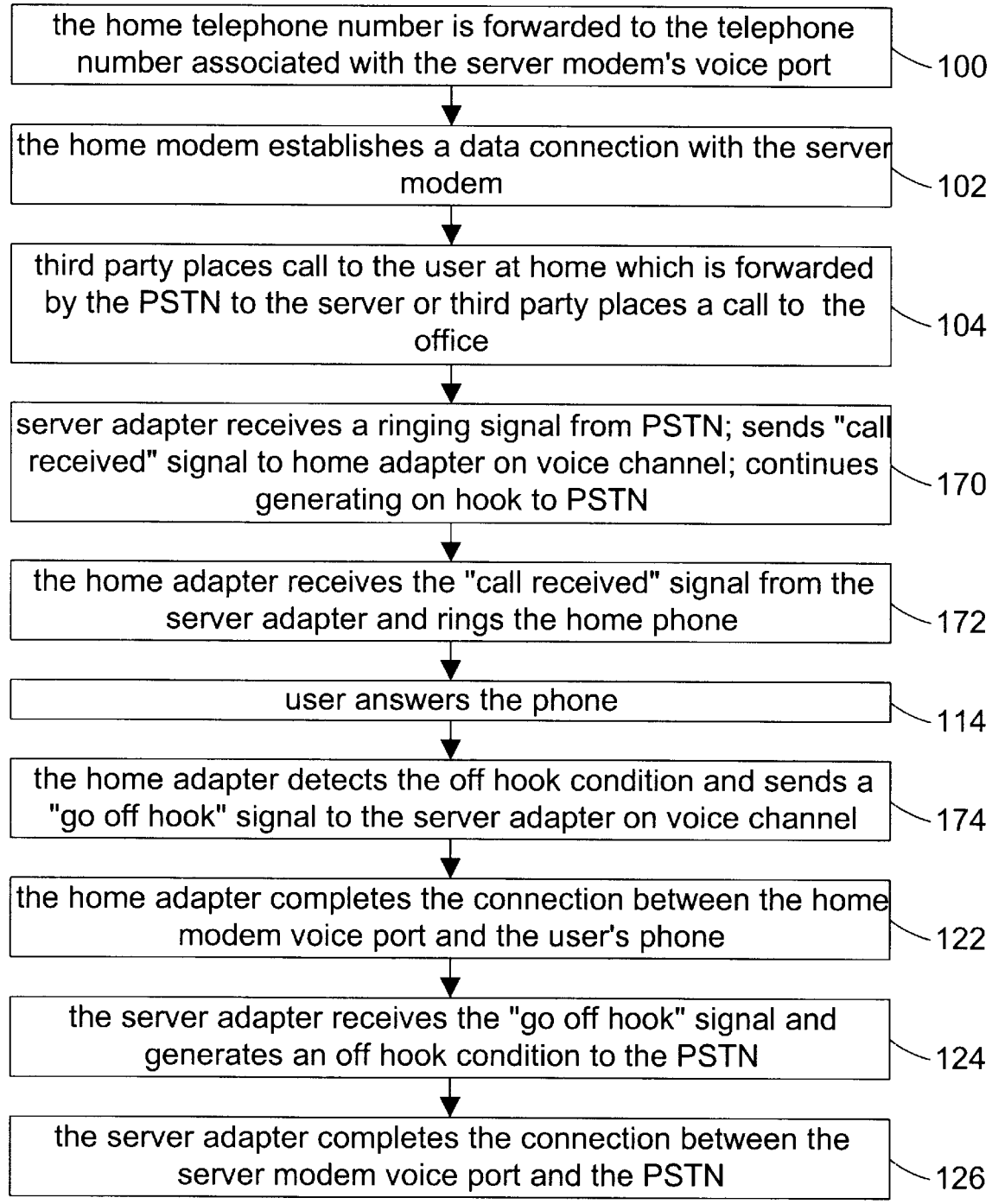
Figure 10:
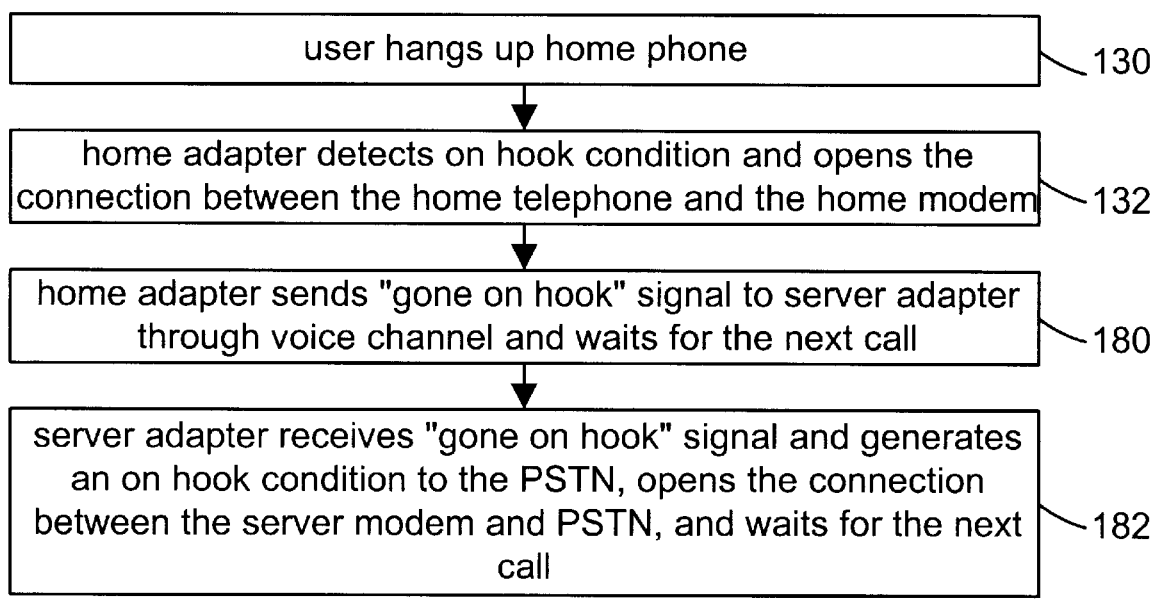
Figure 11:
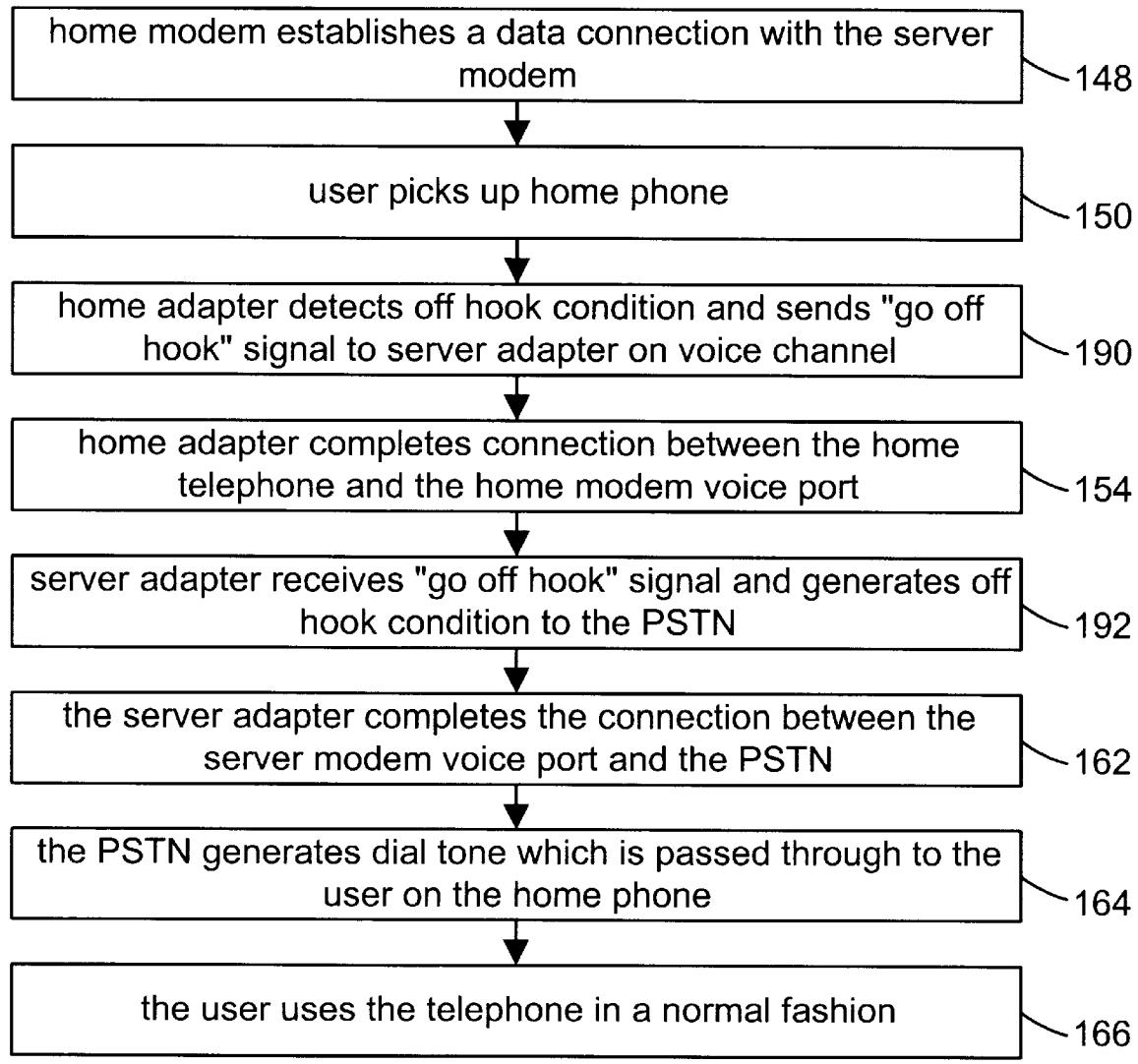

Referring now to FIG. 9, a flowchart illustrating operation of the alternate embodiment of system 10 of FIG. 1 during a call placed by a third party to the user is shown. Various of the steps of FIGS. 9–11 are similar to steps performed in FIGS. 4–6 and corresponding steps are numbered identically for clarity. Consequently, the description of those similar steps will not be repeated in the interest of brevity.

Steps 100, 102 and 104 of FIG. 9 are similar to correspondingly numbered steps of FIG. 4. In the alternate embodiment, a voice channel is activated when the connection is established in step 102. When the server adapter 16 receives the ringing voltage from the PSTN 18, the server adapter 16 sends a "call received" signal to the home adapter 26 on the voice channel, in step 170, rather than generating an off hook condition to the server modem 14 voice port, as was performed in step 106 of FIG. 4. Preferably, sending a "call received" signal comprises the processor 92 controlling the DTMF generator 90 to generate one or more predetermined tones on the voice channel to the home adapter 26.

Preferably, the processor 92 begins the process of answering the call, i.e., controls the DTMF generator 90 to generate the tones, only if a valid data connection has already been established on the server modem 14 data port, as in step 102. That is, if no valid data connection has been established, the server adapter 16 does not answer the call. This is advantageous in that the user may be present in the office and desire to answer the call on the office telephone 30. Furthermore, this prevents unauthorized users from establishing a data connection and subsequently receiving telephone calls intended for the authorized user.

The home adapter 26 receives the "call received" signal from the server adapter 16 and rings the home telephone 28 in response, in step 172. Preferably, receiving the "call received" signal comprises the DTMF detector 60 detecting the one or more predetermined tones generated by the DTMF generator 90 and notifying the processor 62 of the detection of the tones. Thus, steps 106–112 of FIG. 4 are replaced essentially by steps 170 and 172 of FIG. 9.

The user hears the home telephone 28 ringing and answers the phone 28, in step 114. The loop current detector 48 detects the off hook condition generated by the answered home telephone 28 and communicates the off hook condition to the processor 62, in step 174. In response, the processor 62, controls the DTMF generator 60 to send a "go off hook" signal to the server adapter 16, in step 174. Steps 122–126 are then performed as described with respect to FIG. 4.

Referring now to FIG. 10, a flowchart illustrating steps to end a call, such as the call made according to FIG. 9 or the call made according to FIG. 11, in the alternate embodiment system 10, is shown. Various of the steps of FIG. 10 are similar to steps performed in FIG. 5 and corresponding steps are numbered identically for clarity. Consequently, the description of those similar steps will not be repeated in the interest of brevity. In particular, steps 130 and 132 are as described with respect to FIG. 5.

The home adapter 26 sends a "gone on hook" signal to the server adapter 16 via the voice channel and waits for the next call, in step 180. Preferably, the "gone on hook" signal comprises the DTMF generator 60 generating one or more predetermined DTMF tones. The server adapter 16 receives the "gone on hook" signal from the home adapter 26, in step 182. Preferably, the DTMF detector 90 detects the one or more predetermined DTMF tones and notifies the processor 92 of the tones. In response, the processor 92 opens hook switch 78 to generate an on hook condition to the PSTN 18, in step 182. The processor 92 then opens the pass-through switch 80 to open the connection between the server modem 14 voice port and the PSTN 18 and waits for the next call, in step 182.

Referring now to FIG. 11, a flowchart illustrating operation of the alternate embodiment of system 10 of FIG. 1 during a call placed by a the user of the home telephone 28 is shown. Various of the steps of FIG. 11 are similar to steps performed in FIG. 6 and corresponding steps are numbered identically for clarity. Consequently, the description of those similar steps will not be repeated in the interest of brevity. In particular, steps 148 and 150 are as described with respect to FIG. 6. In the alternate embodiment, a voice channel is activated when the connection is established in step 148.

The loop current detector 48 senses the loop current generated by the off hook condition generated by the home telephone 28 and notifies the processor 62 of the off hook condition, in step 190. In response, the processor 62 controls the DTMF generator to generate a "go off hook" signal, preferably comprising one or more predetermined tones, to the server adapter 16 on the voice channel, in step 190. The home adapter 26 performs step 154 as in FIG. 6.

The DTMF detector 90 receives the "go off hook" signal and notifies the processor 92, in step 192. In response, the processor 92 closes the hook switch 78 to generate on off hook condition to the PSTN 18, in step 192. Thus, steps 156, 158 and 160 of FIG. 6 are replaced by step 192 of FIG. 11. Steps 162–166 are performed as described with respect to FIG. 6.

Preferably, the processor 92 responds to the call, i.e., closes the hook switch 78, only if the user has been authenticated. That is, if the user has not been authenticated, the server adapter 16 does not generate an off hook condition to the PSTN 18 and therefore, the unauthorized caller is not enabled to place an outgoing call. This is advantageous in that it prevents unauthorized users from placing telephone calls, in particular long distance telephone calls, using the office telephone line 2. As described above, the authentication may be performed via the data channel or the authentication may be performed via a voice channel, as when using tones to dial a password.

It is noted that when the voice channel is established between the modems 14 and 24 and the server adapter 16 and home adapter 26 complete the connection between the telephone 28 and the PSTN 18 or PBX of the office, the user is enabled to access the facilities and features of the office telephone system or PSTN 18. That is, any features requiring signaling, such as DTMF signaling may be utilized by the user. The present invention contemplates the home adapter 26 detecting a flash hook operation being performed on the telephone 28 and the home adapter 26 sending DTMF tones to the server adapter 16 to indicate the flash hook operation. In response, the server adapter 16 performs a flash hook operation on the SLT interface 75 to the PSTN 18 or PBX.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for providing a user operating a first modem and a first telephony adapter with a virtual presence at a remote data site including a second modem and a second telephony adapter, wherein said first and second modems are coupled to a telephone network, wherein said first telephony adapter is coupled between a telephone instrument and said first modem, wherein said second telephony adapter is coupled between the telephone network and said second modem, the method comprising:

establishing a data connection between said first and second modems;

said second telephony adapter detecting a ringing signal from the telephone network after said establishing said data connection;

said second telephony adapter communicating said detecting said ringing signal to said first telephony adapter;

said first telephony adapter ringing said telephone instrument in response to said second telephony adapter communicating said detecting said ringing signal;

said first telephony adapter detecting the user answering said telephone instrument;

said first telephony adapter communicating said detecting said answering to said second telephony adapter; and said second telephony adapter generating an off hook condition to said telephone network in response to said first telephony adapter communicating said detecting said answering.

2. The method of claim 1, further comprising:

said second telephony adapter coupling said telephone network to said second modem in response to said first telephony adapter communicating said detecting said answering;

said first telephony adapter coupling said telephone instrument to said first modem after said detecting the user answering said telephone instrument; and transmitting speech between said telephone instrument and said telephone network after said second telephony adapter coupling said telephone network to said second modem and said first telephony adapter coupling said telephone instrument to said first modem.

3. The method of claim 2, further comprising:

transferring data between said first and second modems simultaneously with said transmitting said speech.

4. The method of claim 1, wherein said second telephony adapter communicating said detecting said ringing signal to said first telephony adapter comprises:

said second telephony adapter generating an off hook condition to said second modem;

said second modem communicating the reception of said call to said first modem in response to said second telephony adapter generating said off hook condition; and said first modem generating a ringing signal to said first telephony adapter in response said second modem communicating the reception of said call to said first modem.

5. The method of claim 1, wherein said second telephony adapter communicating said detecting said ringing signal to said first telephony adapter comprises:

said second telephony adapter transmitting one or more predetermined tones to said first telephony adapter.

6. The method of claim 5, further comprising:

establishing a voice channel between said first and second modems for transmitting voice information, wherein said one or more predetermined tones are transmitted by said second telephony adapter to said first telephony adapter on said voice channel.

7. The method of claim 1, wherein said first telephony adapter communicating said detecting said answering to said second telephony adapter comprises said first telephony adapter transmitting one or more predetermined tones to said second telephony adapter.

8. The method of claim 7, further comprising:

establishing a voice channel between said first and second modems for transmitting voice information, wherein said one or more predetermined tones are transmitted by said first telephony adapter to said second telephony adapter on said voice channel.

9. The method of claim 7, further comprising:

said first telephony adapter generating an off hook condition to said first modem prior to said first telephony adapter transmitting one or more predetermined tones to said second telephony adapter.

10. The method of claim 1, further comprising:

performing a call forwarding operation prior to said second telephony adapter detecting a ringing signal from the telephone network, wherein said call forwarding operation causes the telephone network to forward calls placed to the telephone instrument to be forwarded to the second modem.

11. The method of claim 1, further comprising:

said first telephony adapter detecting the user hanging up said telephone instrument;

said first telephony instrument communicating said detecting said hanging up to said second telephony adapter; and said second telephony adapter generating an on hook condition to said telephone network in response to said first telephony instrument communicating said detecting said hanging up.

12. The method of claim 11, wherein said first telephony instrument communicating said detecting said hanging up to said second telephony adapter comprises said first telephony adapter transmitting one or more predetermined tones to said second telephony adapter.

13. The method of claim 1, further comprising:

determining if the user is authentic;

wherein said second telephony adapter generates said off hook condition to said telephone network only if the user is authentic.

14. A method for providing a user operating a first modem and a first telephony adapter with a virtual presence at a remote data site including a second modem and a second telephony adapter, wherein said first and second modems are coupled to a telephone network, wherein said first telephony adapter is coupled between a telephone instrument and said first modem, wherein said second telephony adapter is coupled between the telephone network and said second modem, the method comprising:

establishing a data connection between said first and second modems;

said first telephony adapter detecting an off hook condition from the telephone instrument after said establishing said data connection;

said first telephony adapter communicating said detecting said off hook condition to said second telephony adapter;

said second telephony adapter generating an off hook condition to the telephone network in response to said first telephony adapter communicating said detecting said off hook condition;

said first telephony adapter coupling said first modem to said telephone instrument after said first telephony adapter communicating said detecting said off hook condition; and said second telephony adapter coupling said second modem to the telephone network in response to said first telephony adapter communicating said detecting said off hook condition.

15. The method of claim 14, wherein said first telephony adapter communicating said detecting said off hook condition to said second telephony adapter comprises:

said first telephony adapter generating an off hook condition to said first modem;

said first modem communicating said off hook condition to said second modem in response to said first telephony adapter generating said off hook condition; and said second modem generating a ringing signal to said second telephony adapter in response to said first modem communicating said off hook condition to said second modem.

16. The method of claim 14, wherein said first telephony adapter communicating said detecting said off hook condition to said second telephony adapter comprises said first telephony adapter transmitting one or more predetermined tones to said second telephony adapter.

17. The method of claim 16, further comprising:

establishing a voice channel between said first and second modems for transmitting voice information, wherein said one or more predetermined tones are transmitted by said first telephony adapter to said second telephony adapter on said voice channel.

18. The method of claim 14, further comprising:

said first telephony adapter detecting the user hanging up said telephone instrument;

said first telephony instrument communicating said detecting said hanging up to said second telephony adapter; and said second telephony adapter generating an on hook condition to said telephone network in response to said first telephony instrument communicating said detecting said hanging up.

19. The method of claim 14, further comprising:

determining if the user is authentic;

wherein said second telephony adapter generates said off hook condition to said telephone network only if the user is authentic.

20. A telephony adapter system for providing a user with a virtual presence at an remote data site, comprising:

a first telephony adapter located at the user premises configured for coupling between a telephone instrument and a first modem, wherein the first modem is configured for coupling to a telephone network; and a second telephony adapter located at the remote data site configured for coupling between the telephone network and a second modem, wherein the second modem is configured for coupling to the telephone network;

wherein said second telephony adapter comprises:

a ring detector for detecting a ringing signal generated by the telephone network;

means for communicating detection of said ringing signal to said first telephony adapter; and a switch for generating an off hook condition to the telephone network in response to said first telephony adapter communicating detection of an off hook condition generated by the telephone instrument and for generating an on hook condition to the telephone network in response to said first telephony adapter communicating detection of an on hook condition generated by the telephone instrument;

wherein said first telephony adapter comprises:

a ring generator for ringing said telephone instrument in response to said second telephony adapter communicating detection of said ringing signal generated by the telephone network;

a loop current detector for detecting on and off hook conditions generated by the telephone instrument; and means for communicating said on and off hook conditions generated by the telephone instrument to said second telephony adapter.

21. The system of claim 20, wherein said means for communicating detection of said ringing signal comprises a switch for generating an off hook condition to said second modem.

22. The system of claim 20, wherein said means for communicating detection of said ringing signal comprises a tone generator for generating one or more predetermined tones for communicating detection of said ringing signal.

23. The system of claim 20, wherein said means for communicating said on and off hook conditions generated by the telephone instrument comprises a switch for generating on and off hook conditions to the first modem.

24. The system of claim 20, wherein said means for communicating said on and off hook conditions generated by the telephone instrument comprises a tone generator for generating a first one or more predetermined tones for communicating said on hook conditions and a second one or more predetermined tones for communicating said off hook conditions.

25. The system of claim 20, wherein said first telephony adapter further comprises a battery for supplying line power to the telephone instrument.

26. The system of claim 20, wherein said first telephony adapter further comprises a switch for selectively coupling the telephone instrument and the first modem for passing audio signals between the telephone instrument and the first modem.

27. The system of claim 20, wherein said second telephony adapter further comprises a switch for selectively coupling the telephone network and the second modem for passing audio signals between the telephone network and the second modem.

28. The system of claim 20, wherein said first telephony adapter further comprises a ring detector for detecting a ringing signal from the first modem and said second telephony adapter further comprises a ring detector for detecting a ringing signal from the second modem.

29. The system of claim 20, wherein said second telephony adapter further comprises a tone detector for detecting one or more predetermined tones transmitted by said first telephony adapter indicating an off hook condition generated by the telephone instrument.

30. The system of claim 20, wherein said second telephony adapter comprises authentication circuitry for storing authentication information, wherein said second telephony adapter is operable to receive identification information from the user and to authenticate said identification information based upon said authentication information, wherein said second telephony adapter is operable to generate an off hook condition to the telephone network only if said identification information is authentic.

31. The system of claim 20, wherein said second telephony adapter further comprises a communications port for receiving authentication information from a computer coupled to the communications port, wherein said second telephony adapter is operable to receive identification information from the user and to authenticate said identification information based upon said authentication information received from said computer, wherein said second telephony adapter is operable to generate an off hook condition to the telephone network only if said identification information is authentic.

32. The system of claim 20, wherein said second telephony adapter further comprises a processor for receiving an input from said ring detector and for controlling said means for communicating detection of said ringing signal in response to said input.

33. A telephony adapter located at a data site remote from a user for providing the user with a virtual presence at the remote data site, comprising:

a first interface for coupling to a telephone network, comprising:
    a ring detector for detecting a ringing signal generated by the telephone network; and
    a first switch for generating on and off hook conditions to the telephone network;

a second interface for coupling to a first modem located at the remote data site, comprising:
    means for detecting a signal from a second modem located proximate to the user indicating generation of an off hook condition generated by a telephone instrument operably coupled to the second modem; and
    means for generating a signal to the second modem indicating the detection of said ringing signal generated by the telephone network; and a second switch for selectively coupling said first and second interfaces for passing audio signals between the telephone network and the first modem.

34. The adapter of claim 33, wherein said detecting means comprises a ring detector for detecting a ringing signal generated by the first modem.

35. The adapter of claim 33, wherein said detecting means comprises a tone detector for detecting one more predetermined tones indicating an off hook condition of the telephone instrument.

36. The adapter of claim 33, wherein said generating means comprises a tone generator for generating one or more predetermined tones for indicating detection of said ringing signal generated by the telephone network.

37. The adapter of claim 33, wherein said generating means comprises a hook switch for generating an off hook condition to the first modem for indicating detection of said ringing signal generated by the telephone network.

38. The adapter of claim 33, further comprising a tone detector for detecting one more predetermined tones indicating an on hook condition generated by the telephone instrument.

39. The adapter of claim 33, further comprising:
authentication circuitry for storing authentication information, wherein said telephony adapter is operable to receive identification information from the user and to authenticate said identification information based upon said authentication information, wherein said telephony adapter is operable to generate an off hook condition to the telephone network only if said identification information is authentic.

40. The system of claim 33, wherein said telephony adapter further comprises a communications port for receiving authentication information from a computer coupled to the communications port, wherein said telephony adapter is operable to receive identification information from the user and to authenticate said identification information based upon said authentication information received from said computer, wherein said telephony adapter is operable to generate an off hook condition to the telephone network only if said identification information is authentic.

41. The system of claim 33, wherein said second telephony adapter further comprises a processor for receiving inputs from said ring detector and detecting means and for controlling said generating means and said first and second switches in response to said inputs.

* * * * *